Aug. 11, 1931.  F. J. KRAMER  1,818,961
SCAFFOLD
Filed Sept. 22, 1930
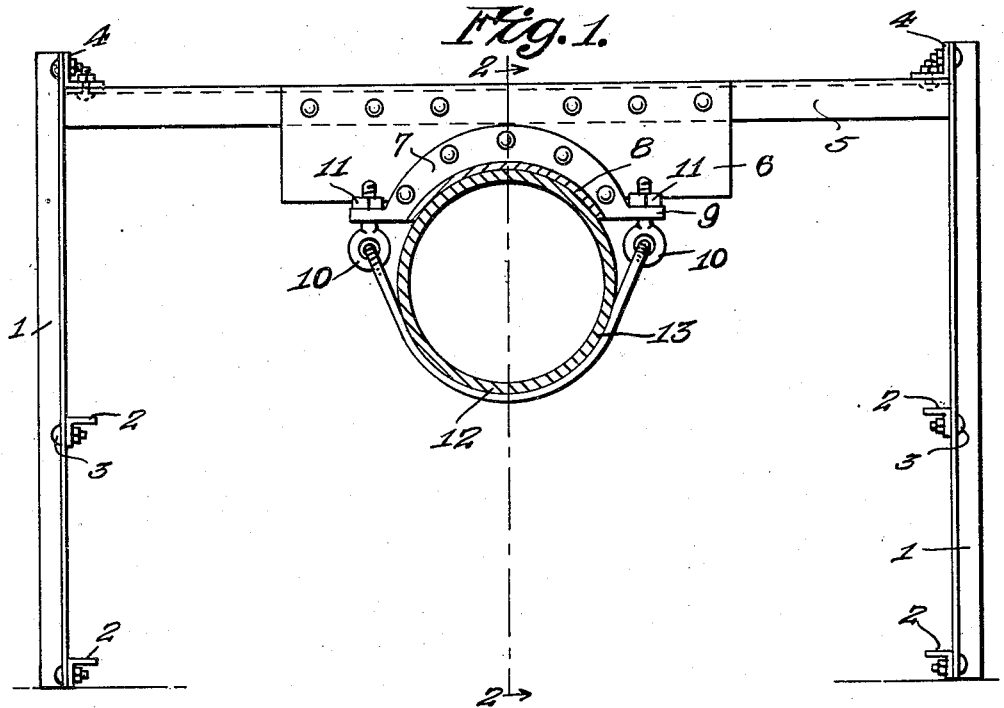
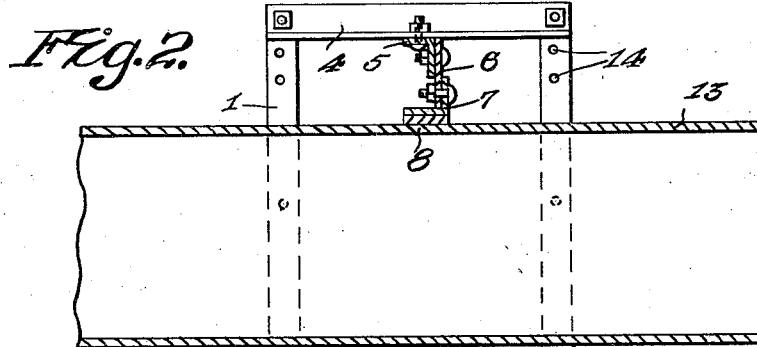
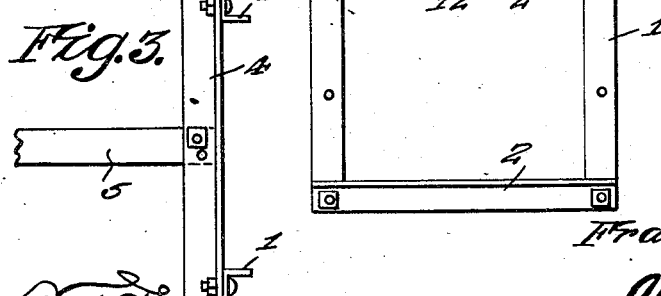
Frank J. Kramer
INVENTOR
BY Victor J. Evans
ATTORNEY
WITNESS:

Patented Aug. 11, 1931

1,818,961

UNITED STATES PATENT OFFICE

FRANK J. KRAMER, OF MELVINDALE, MICHIGAN, ASSIGNOR OF ONE-HALF TO MILDRED WICK, OF DETROIT, MICHIGAN

SCAFFOLD

Application filed September 22, 1930. Serial No. 483,688.

My present invention has reference to a scaffold to be employed for stringing or connecting a line of elevated pipe, my object being the provision of a scaffold for this purpose which will support the pipe sections thereon to permit of the workman readily connecting said sections.

A further object is the provision of a scaffold for this purpose which comprises separable and adjustable parts whereby a pipe line may be connected and supported at desired elevations.

To the attainment of the foregoing the invention consists in the improvement hereinafter described and definitely claimed.

In the drawings:

Figure 1 is an elevation of the improvement in applied position, the pipe being in section.

Figure 2 is a sectional view approximately on the line 22 of Figure 1.

Figure 3 is a detail plan view.

My improvement is wholly constructed of suitable metal which is light in weight but which is of a suitable strength for its purpose. The improvement comprises uprights in the nature of corner members 1. These corner members are of angle irons and are arranged in spaced pairs, the said pairs being connected by transverse brace members 2 which are also in the nature of angle irons. The corner posts are provided with series of apertures through certain of which are passed the bolts 3 that connect the brace members 2 to the said posts and whereby the brace members are adjustably associated with the posts. The brace members on the corner posts serve as steps whereby the workmen may ascend or descend the scaffold. The corner posts of the scaffold are removably connected together by transverse angle irons 4 which have their horizontal flanges of a greater length than their vertical flanges and the said horizontal flanges are connected by removable means, such as bolts and nuts to the upper angle member 5 of the scaffold. The depending flange of the member 5 has bolted or otherwise secured thereto a depending plate 6, the said plate having its outer or lower edge centrally formed with an arcuate depression that receives therein and has bolted thereto the flange of an arched saddle member 7. The concaved or lower face of the saddle member has arranged thereon a compressible sheet or strip 8 and the saddle member has its corners provided with outstanding flanges 9 which are apertured. These apertures are designed to have passed therethrough the shanks of eye bolts 10, the said bolts being engaged by suitable nuts 11. Each pair of eye bolts has attached thereto a strap 12 in the nature of a strong rod or wire, the same being rounded upon itself to engage with the lower portion of one of the line pipe sections 13.

In practice one of the eye bolts is attached and the pipe is elevated by the workman into the saddle against the compressible facing 8 therein. Thereafter the second eye bolt is passed through the aperture in the second flange 9 of the saddle and the nut 11 is screwed thereon. In this manner it will be apparent that the pipe sections 13 may be easily and effectively supported so that the same may be readily coupled. As stated, the posts 1 are provided with series of apertures 14 so that the angle members 4 as well as the stepped braces 2 may be adjustably secured to the posts and whereby the member 5 may be supported at desired elevation with respect to the ends of the scaffold and consequently the pipe line may be supported at desired elevations.

Having described the invention, I claim:

1. A scaffold for supporting the sections of an elevated pipe line, comprising spaced corner posts, adjustable braces for connecting the posts, angle irons adjustably secured to the posts adjacent to the upper ends of said posts, a longitudinal angle member removably secured to the angle irons, an arched saddle carried by the longitudinal member and having its ends provided with outstanding apertured ears, eye bolts passing through the ears and engaged by nuts and a strap member having its ends secured to the eye bolts.

2. A scaffold for supporting pipe line sections at elevations, comprising pairs of spaced angle irons providing corner posts, and said posts being formed with a series of apertures, angle braces affording steps adjustably and removably secured to the corners of the posts, angle irons removably and adjustably secured to the posts adjacent to the upper ends thereof, a longitudinal angle iron removably secured to the upper transverse angle ends, a plate fixed on the longitudinal angle iron and depending therefrom and having its lower edge centrally formed with an arched depression, an arched flanged saddle received in the depression and secured to the plate, said saddle having its ends provided with outwardly directed apertured flanges, a compressible member in the concaved outer face of the saddle, eye bolts removably secured in the apertured flanges of the saddle and a strap having its ends connected to the eye bolts.

In testimony whereof I affix my signature.

FRANK J. KRAMER.